United States Patent
Sasaki et al.

(12)

(10) Patent No.: US 11,676,760 B2
(45) Date of Patent: Jun. 13, 2023

(54) METHOD AND AN APPARATUS FOR PRODUCING A COIL FOR ELECTRIC APPARATUS

(71) Applicant: FUKUI PREFECTURAL GOVERNMENT, Fukui (JP)

(72) Inventors: Yoshinori Sasaki, Fukui (JP); Masaki Hashimoto, Fukui (JP); Taiki Tanaka, Fukui (JP); Hiroshi Sano, Fukui (JP); Yuichi Hashimoto, Fukui (JP)

(73) Assignee: FUKUI PREFECTURAL GOVERNMENT, Fukui (JP)

( * ) Notice: Subject to any disclaimer, the term of this patent is extended or adjusted under 35 U.S.C. 154(b) by 0 days.

(21) Appl. No.: 17/044,138

(22) PCT Filed: May 29, 2019

(86) PCT No.: PCT/JP2019/021202
§ 371 (c)(1),
(2) Date: Sep. 30, 2020

(87) PCT Pub. No.: WO2019/235309
PCT Pub. Date: Dec. 12, 2019

(65) Prior Publication Data
US 2021/0057151 A1 Feb. 25, 2021

(30) Foreign Application Priority Data
Jun. 4, 2018 (JP) .............................. JP2018-106578

(51) Int. Cl.
*H01F 41/04* (2006.01)
*H02K 15/04* (2006.01)

(52) U.S. Cl.
CPC ......... *H01F 41/04* (2013.01); *H02K 15/0435* (2013.01)

(58) Field of Classification Search
CPC ............................ H01F 41/04; H02K 15/0435
(Continued)

(56) References Cited

U.S. PATENT DOCUMENTS 3,466,743 A * 9/1969 De Puy .................. H01F 41/04
83/33

FOREIGN PATENT DOCUMENTS

DE        196 37 288 A1    10/1997
DE   10 2012 011 554 A1    12/2013
(Continued)

OTHER PUBLICATIONS

International Search Report for PCT/JP2019/021202 dated Aug. 13, 2019.
(Continued)

*Primary Examiner* — Peter Dungba Vo
*Assistant Examiner* — Azm A Parvez
(74) *Attorney, Agent, or Firm* — Sughrue Mion, PLLC

(57) ABSTRACT

A method for producing a coil for electric apparatus of the present invention is the method for producing a coil for electric apparatus for cutting spirally a block-shaped workpiece formed with a cylindrical portion corresponding to the coil in a circumferential direction of the cylindrical portion, the spiral coil is formed by turning a cutting means while moving it relatively to the workpiece from a part corresponding to one end of the coil to a part corresponding the other end of the coil along a machining line spirally set in the circumferential direction of the cylindrical portion. According to the invention, since the coil is formed by cutting the continuous cutting machining plane without generating a step in design from the block-shaped workpiece formed with a cylindrical portion corresponding to the coil using a wire-tool etc., it is possible to constitute a high-quality coil.

2 Claims, 15 Drawing Sheets

(58) Field of Classification Search
USPC .......................................... 29/602.1, 592.1
See application file for complete search history.

(56) References Cited

FOREIGN PATENT DOCUMENTS

| | | | |
|---|---|---|---|
| JP | 5-176503 | A | 7/1993 |
| JP | 7-163100 | A | 6/1995 |
| JP | 2847640 | B2 | 1/1999 |
| JP | 2002-223542 | A | 8/2002 |
| JP | 2004-074401 | A | 3/2004 |
| JP | 2004-274965 | A | 9/2004 |
| JP | 2004274965 | A * | 9/2004 |
| JP | 2005-064044 | A | 3/2005 |
| JP | 2005-130676 | A | 5/2005 |
| JP | 2005130676 | A * | 5/2005 |
| JP | 2017-205828 | A | 11/2017 |
| WO | 2019/066568 | A1 | 4/2019 |

OTHER PUBLICATIONS

Communication issued Jul. 13, 2021 by the European Patent Office in application No. 19815105.2.

* cited by examiner

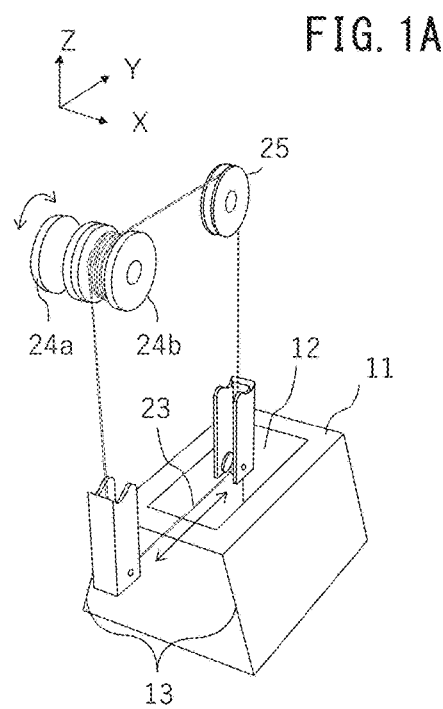
FIG. 1A
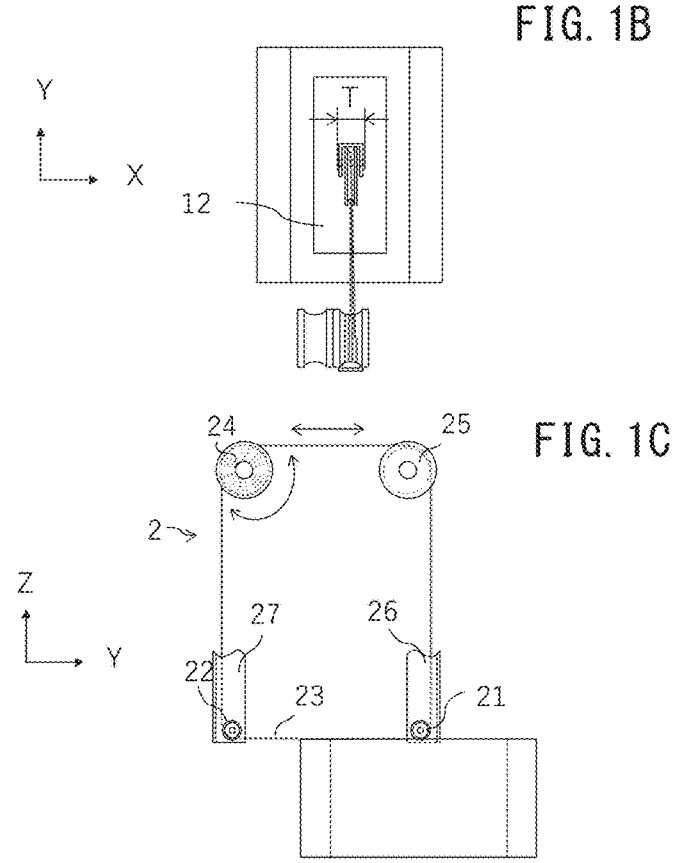
FIG. 1B
FIG. 1C
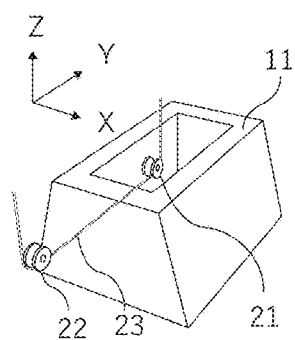
FIG. 2A
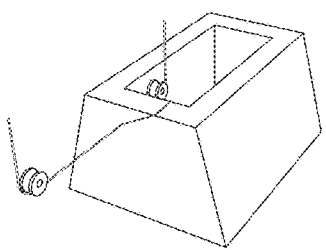
FIG. 2B
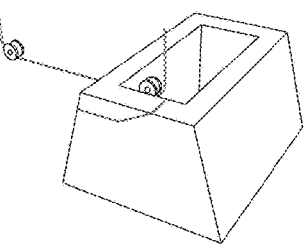
FIG. 2C
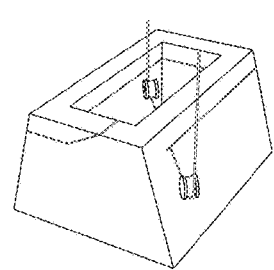
FIG. 2D
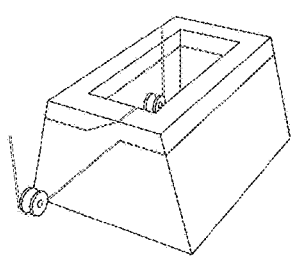
FIG. 2E
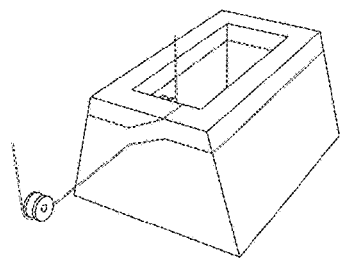
FIG. 2F

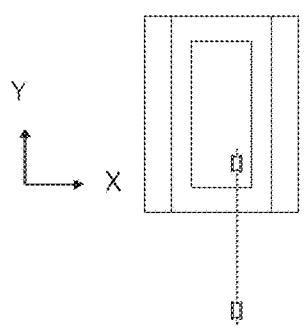
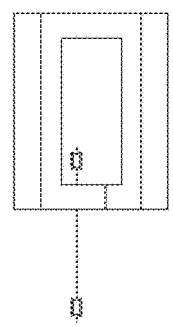
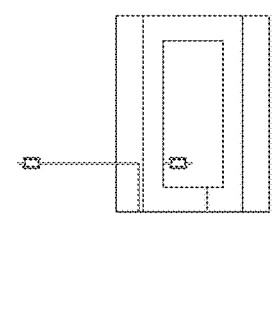
FIG. 3A FIG. 3B FIG. 3C
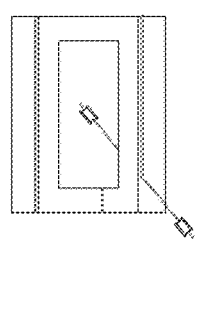
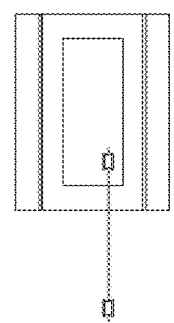
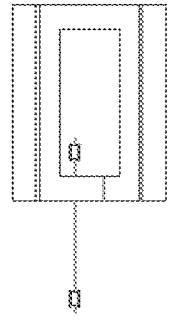
FIG. 3D FIG. 3E FIG. 3F
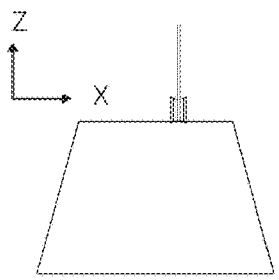
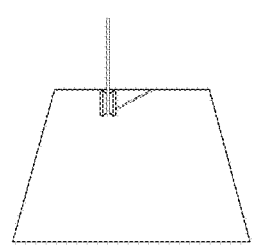
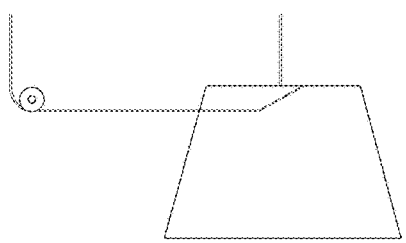
FIG. 4A FIG. 4B FIG. 4C
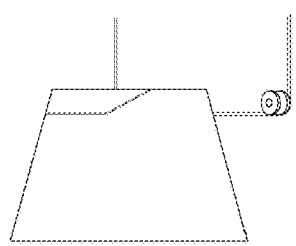
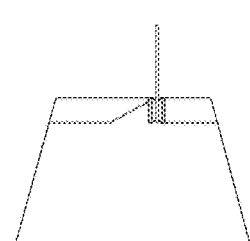
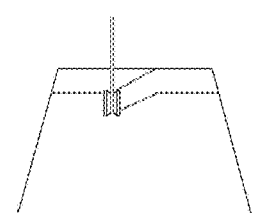
FIG. 4D FIG. 4E FIG. 4F

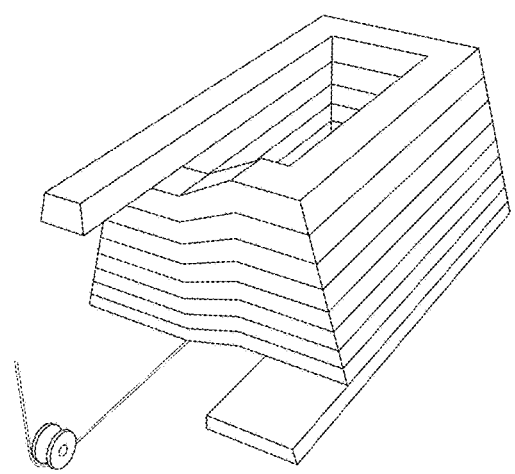
FIG. 7A
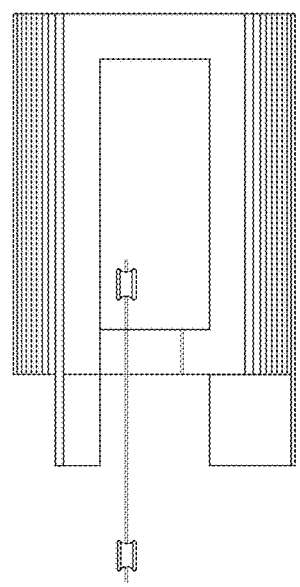
FIG. 7B
FIG. 7C
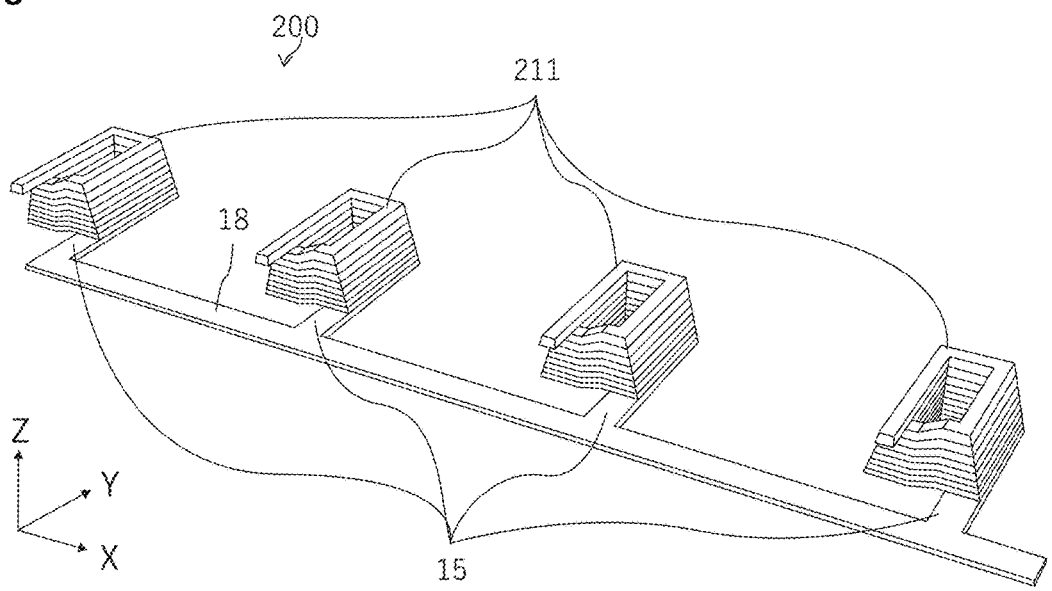
FIG. 8

FIG. 13A
FIG. 13B
FIG. 13C
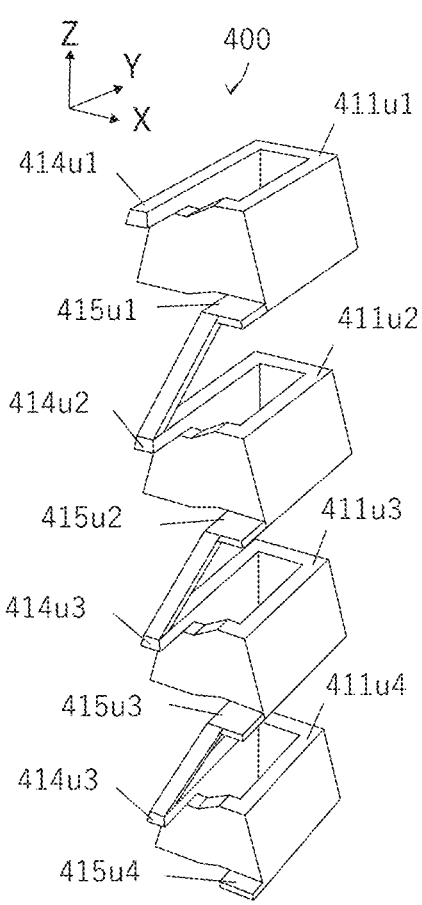
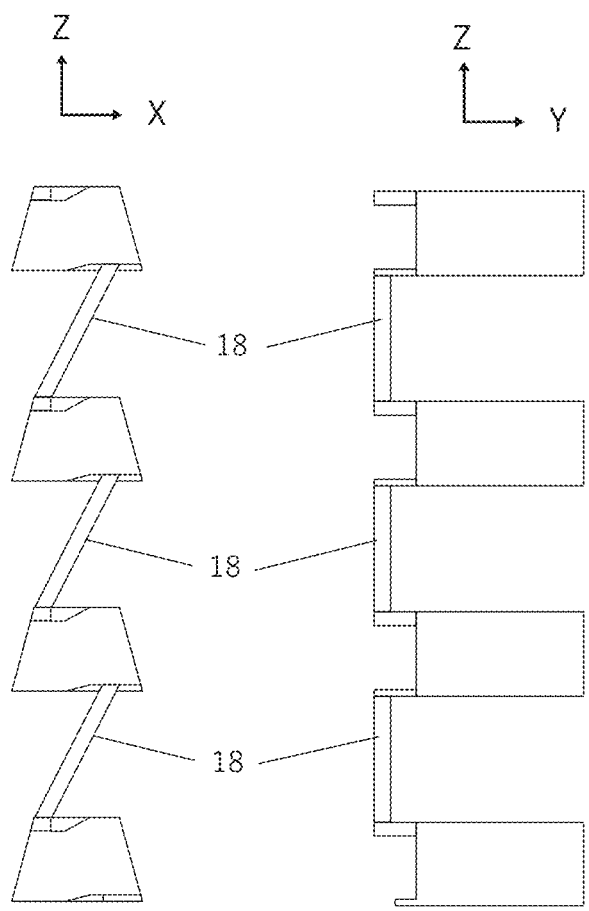

FIG. 19A
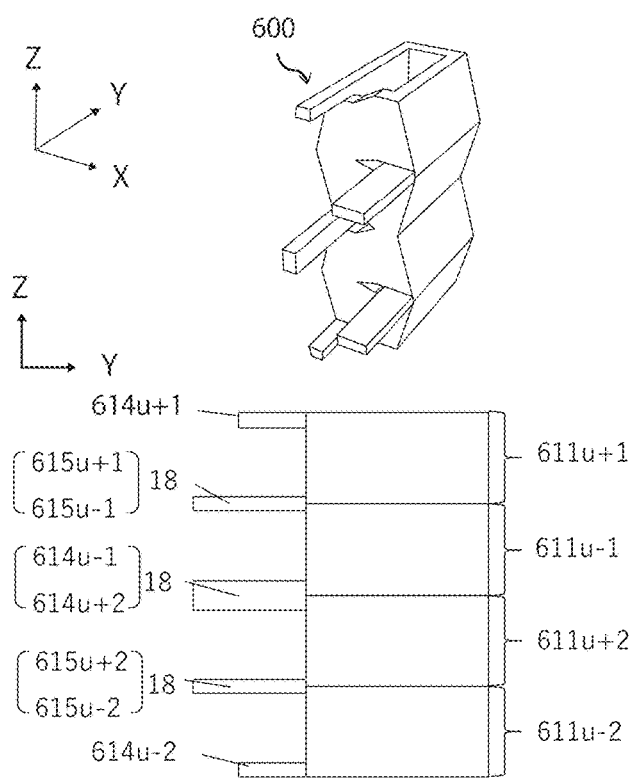
FIG. 19B
FIG. 19C
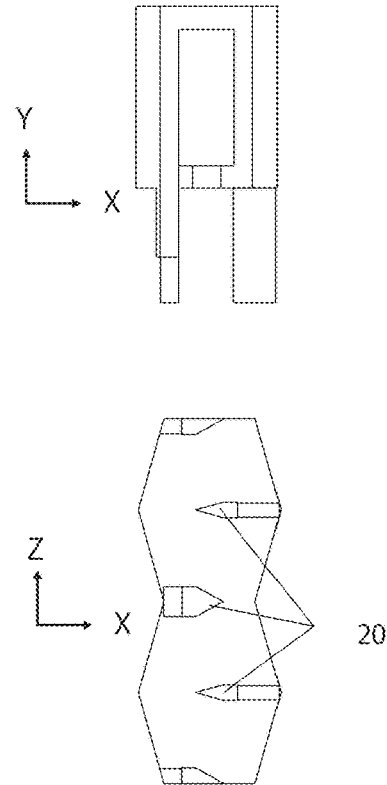
FIG. 19D
FIG. 20A
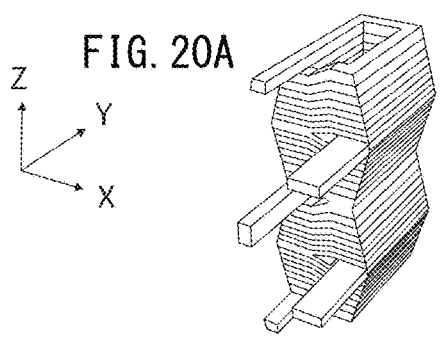
FIG. 20B
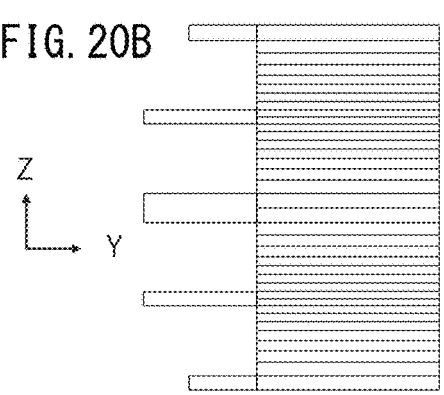
FIG. 20C
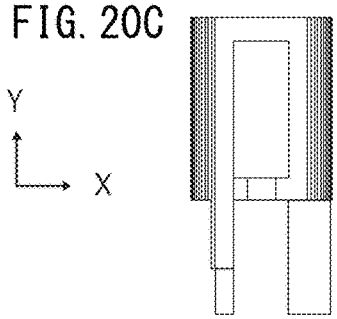
FIG. 20D
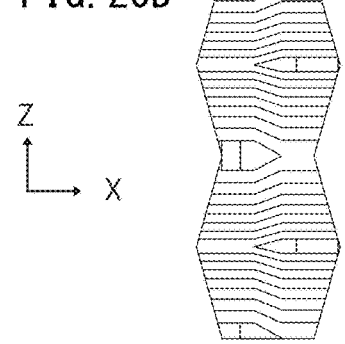

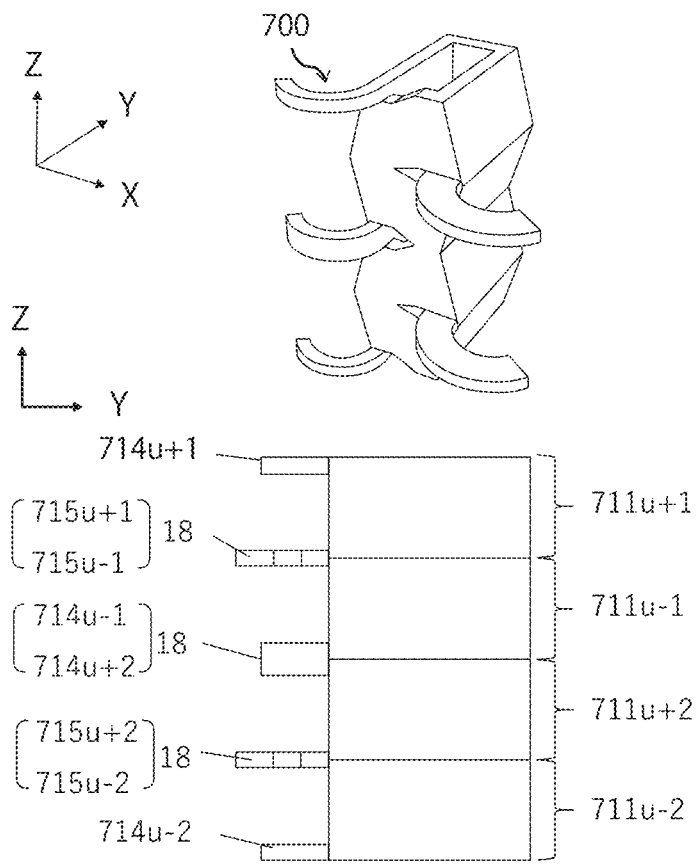
FIG. 23A
FIG. 23B
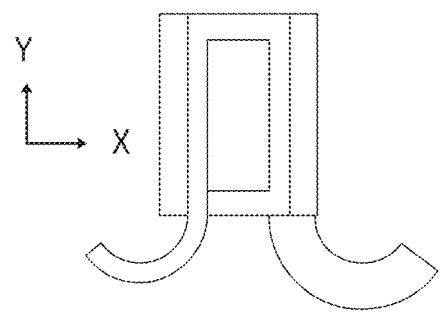
FIG. 23C
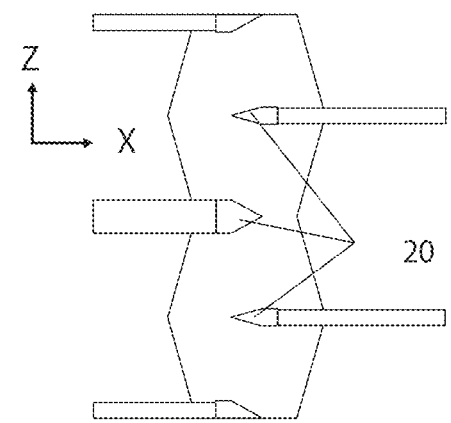
FIG. 23D

FIG. 26A  FIG. 26B  FIG. 26C
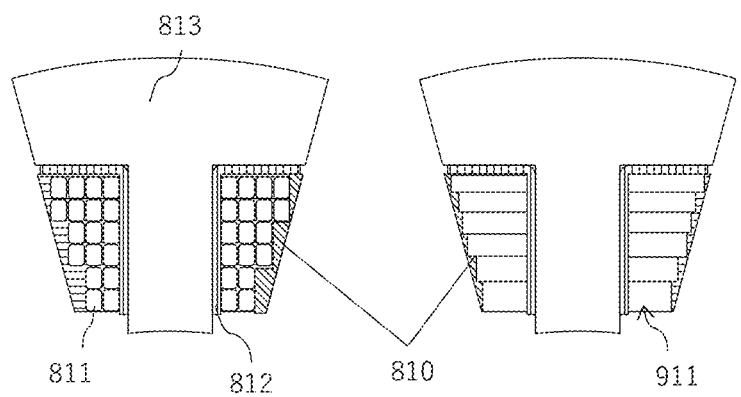
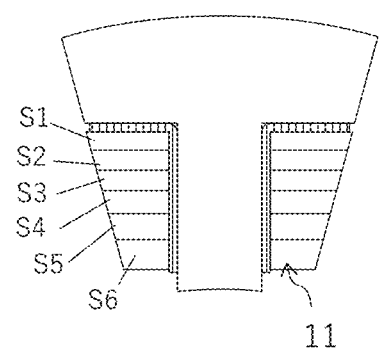

METHOD AND AN APPARATUS FOR PRODUCING A COIL FOR ELECTRIC APPARATUS

CROSS-REFERENCE TO RELATED APPLICATIONS

This application is a National Stage of International Application No. PCT/JP2019/021202 filed May 29, 2019, which claims priority under U.S.C. § 119(a) to Japanese Patent Application No. JP2018-106578 filed Jun. 4, 2018.

TECHNICAL FIELD

The present invention relates to a method and an apparatus for producing a coil to be used in a rotary apparatus such as a motor and an electric apparatus etc. and an electric apparatus such as a transformer etc.

BACKGROUND ART

It is required to realize miniaturization and high power of a motor for electric vehicle and hybrid automotive. Copper loss is one of losses of the motor is caused by joule heat loss due to electric resistance of a conductive wire constituting the coil. Then, it is effective to reduce the electric resistance by increasing a cross-sectional area of a conductor using a thickened wire or a rectangular wire.

As prior arts for increasing the cross-sectional area of a conductor constituting the coil, there exist Patent Document 1, patent document 2 and Patent Document 3.

In Patent Document 1, a technique concerning a coil device is disclosed. As a machining means for it, Patent Document 2 is cited. Specifically, it is disclosed a method for producing a coil characterized in that, in the coil device having a coil portion around which the conductive wire is wound, the coil portion is constituted by winding a square conductive wire, and a cross-sectional shape of the square conductive wire is made different depending on winding positions corresponding to restriction of space in design accommodating the coil portion. Moreover, in FIG. 6 of Patent Document 1, coils which are formed changing both width and thickness of the copper plate every turn are shown.

Patent document 3 discloses a technique concerning a coil and a method for producing the coil. Specifically, it discloses a coil characterized in that it is constituted by integrated block-shaped copper or aluminum, which is the coil of axial gap type DC brushless motor having a stator block consisting of an iron core of a columnar soft magnetic material and having a spiral current path of iron core substantially concentric with the iron core. The disclosed method for producing the coil is characterized in that the spiral current path is produced by either machining for grooving using a cutting tool, wire discharge machining, water jet machining, electron beam machining or laser beam machining, or a combination thereof.

In patent document 4, a method for producing a coil for an electric apparatus is disclosed.

Specifically, there is disclosed a method for producing a coil for an electric apparatus in which conductors each having a rectangular cross-section are wound and spirally stacked in a coil axial direction as supposing its short side cross-section being the coil axial direction, the method for producing the coil for an electric apparatus is characterized in that it comprises; a cutting process for cutting out a plurality of one turn coils each divided into a start end and a terminal end by the cutout portion by slicing machining, while pressing a block shaped material against wire rows in presence of abrasive grains, using the wire saw device having a first roll and a second roll whose outer peripheral surfaces are formed with a plurality of circumferential grooves and the wire rows formed by a plurality of wire portions arranged in parallel between the first roll and the second roll while winding wires between each circumferential groove of the first roll and the second roll, the wire saw device rotating the first roll and the second roll and moving the wire rows linearly for relatively moving the linearly moving wire rows of the wire saw device and the block shaped material having a through hole formed along a center line of the material and cutout portions continuously formed from an end face to the other end face of the material communicated with the through hole, with a direction of liner motion of the wire rows kept almost orthogonal to the center line of the material; and a joining process for joining spirally a plurality of one turn coils by welding or brazing a starting end and a terminal end of adjacent one-turn of respective coils which are overlapped on each other while sequentially shifting a position of each cutout portion.

Patent document 5 discloses a method and an apparatus for producing a coil for an electric apparatus. Specifically, there is disclosed a method for producing a vertically wound coil for an electric apparatus in which flat conductors continuously and spirally wound at a predetermined lead angle in a coil axial direction characterized by the steps of;

rotating and linearly moving wire rows formed by a plurality of wire portions arranged in parallel by winding a wire between each of peripheral grooves of a first roll and a second roll with a plurality of peripheral grooves on an outer peripheral surface arranged in parallel; and producing the vertically wound coil to a block shaped material with a square section provided with a first coil forming portion, a second coil forming portion, a third coil forming portion and a fourth coil forming portion in which a first side, a second side, a third side and a forth side are formed continuously in order around a through hole formed along the center axis of the material through a first ridgeline, a second ridgeline, a third ridgeline and a forth ridgeline, by performing groove machining to the first coil forming portion while pressing the first side against the linearly moving wire rows, to the second coil forming portion, the third coil forming portion and the forth coil forming portion while pressing the first side, the second side, the third side and the forth side against the wire rows in order by rotating on the first ridgeline, the second ridgeline and third ridgeline in the presence of the abrasive grain, with a crossing angle between an axis of rotation of the first roll and the center axis of the material kept at about same angle as the lead angle of the coil.

CITATION LIST

Patent Literature

Patent Document 1: Japanese Patent Laid-Open No. 2002-223542

Patent Document 2: Japanese Patent No. 2847640

Patent Document 3: Japanese Patent Laid-Open No. H07-163100

Patent Document 4: Japanese Patent Laid-Open No. 2005-130676

Patent Document 5: Japanese Patent Laid-Open No. 2005-64044

SUMMARY OF INVENTION

Technical Problems

However, there are problems described below in Patent Document 1 to Patent Document 5. FIG. 25 shows the stator of a 3-phase radial gap motor in which 12 pieces of coil are arranged in divided cores 813 together with an insulator 812 formed by a rectangular wire. FIG. 26A shows a schematic view of the stator when being cut in a vicinity of the center of the core by a plane with a normal that is the rotational axis (not shown). When a coil consisting of wound rectangular wire is used, since a conductor of rectangular cross section is piled up in a stepwise shape, dead space 810 is generated in a tapered slot space which cannot be effectively utilized.

As shown in FIG. 26B, in a coil shown in FIG. 6 in Patent Document 1, since a copper plate has a substantially rectangular cross-section, the dead spaces 810 which cannot be effectively utilized are generated in the slot space as well. Moreover, it is shown to form a curved part Wr using a method of Patent Document 2 by a conical roll shown in FIG. 4 of Patent Document 1. Since the curved part is formed corresponding to differences in crushing quantity in the wire, it is difficult to form a curved part of a large curvature (small radius).

A coil of required shape can be obtained in Patent Document 3, if cutting machining of a linear groove is performed divided in two times, however, since it is needed to connect a start and a terminal ends of a firstly machined groove to a secondly machined groove which is diagonally crossed to the firstly machined groove, high machining accuracy is required.

Moreover, since a step is formed at a point where the firstly machined groove and the secondly machined groove intersect, there is concern over the quality degradation of the coil due to reduction of cross-sectional area of the conductor.

In Patent Document 4, it is needed a bonding process for bonding a plurality of one turn coils each having a cutout portion which is cut out from the block by a wire-saw etc., in which process the terminal end and the start end of adjacent respective one turn coils are spirally bonded in order by welding or brazing, while shifting positions of each cutout portions and piling them.

Since it is needed to perform bonding according to the number of turns of the coil, the more the number of turn increases, the more expensive it is, and it is concerned over the quality reduction of coil due to increase in electric resistance of the bonding part.

In Patent Document 5, it is described that a vertical wound coil in which the flat conductors are spirally and continuously wound in the direction of the coil axis is produced by performing machining for grooving on the first coil forming portion, the second coil forming portion, the third coil forming portion and the forth coil forming portion that are the first side, the second side, the third side and the forth side arranged continuously in order. Though the first coil forming portion, the second coil forming portion, the third coil forming portion and the fourth coil forming portion on the first side, the second side, the third side and the fourth side are continuous, a plane (1) including the first coil forming portion where the center line La of the material is a line perpendicular to the plane, a plane (2) including the second coil forming portion where the center line La of the material is a line perpendicular to the plane, a plane (3) including the third coil forming portion where the center line La of the material is a line perpendicular to the plane, a plane (4) including the fourth coil forming portion where the center line La of the material is a line perpendicular to the plane, these planes (1) to (4) are different planes.

When performing the cutting machining on the surfaces (1) to (4) as with that in Patent Document 3, the step is formed at the corner part where each plane intersects. To eliminate formation of the step, machining is performed continuously and smoothly by making use of a wire slightly deflected following the machined groove, machining without forming the step is performed continuously and smoothly. Since the wider a machining width of grooving at the corner part becomes, the smaller a cross-sectional area of the coil is, the formation of the step and the cross-sectional area of the coil are in the relation of trade-off.

Patent Document 5 discloses to vary the thickness every torn to maintain the cross-section at approximately constant in FIG. 8. A pitch of wire 25-$n$ of the wire row 25L and the lead angle are properly set every turn according to the prescribed thickness. If the lead angle is different every wire, since the step at the forward and backward connecting points become large as compared to a case that the lead angle is identical, for continuously machining, it is needed to enlarge the groove width to be produced, there is concern over further decrease in the occupancy ratio.

As a common problem of Patent Document 1 to Patent Document 5, it is necessary to connect each coil electrically and physically using a bus bar or the like, when the coil is used for the motor.

For solving such a problem, an object of the present invention is to provide a high-quality coil with low electric resistance (1), and to provide a coil unit with a plurality of coils continuously connected (2).

Solution to Problem

A method for producing a coil for an electric apparatus by cutting spirally a block-shaped workpiece formed with a cylindrical portion corresponding to the coil in a circumferential direction of the cylindrical portion, wherein the spiral coil is formed by turning a cutting means while moving it from a part corresponding to one end side to a part corresponding to the other end side of the coil relatively to the workpiece along a machining line set spirally in a circumferential direction of the cylindrical portion.

The cutting means may include a wire-tool which is stretched between a first roll and a second roll arranged on the inside and the outside of the cylindrical portion respectively, the first roll and the second roll are moved relatively to the cylindrical portion and turned so as to move the wire-tool along the machining line while performing a cutting operation by moving the wire-tool in its lengthwise direction.

A spiral coil may be informed by repeating a first machining process for cutting one circular part of the machining line by turning the second roll while moving it relatively to the cylindrical portion and a second machining process for cutting a transition part to a next circular part of the machining line by moving the first roll and the second roll relatively to the cylindrical portion.

The work piece may include a lead-out portion molded at a part of the cylindrical portion corresponding to the one end side or the other end side of the cylindrical coil and a step portion formed on an end face of the cylindrical portion where the lead-out is molded.

The workpiece may include a plurality of cylindrical portions integrally attached to a connecting member through the lead-out portion.

The workpiece may be attached such that a direction of center axis of the machining line of at least one of the cylindrical portions is different from that of the other of the cylindrical portion.

The workpiece may include the connecting member formed with recessed parts through which the cutting means can pass.

The workpiece may include the cylindrical portions which are arranged in series and integrally attached to the connecting member.

The workpiece may be formed with the cylindrical portion corresponding to the plurality of coils.

The workpiece may be formed with a respective opening at part corresponding to one end side or the other end side of the coil.

The workpiece may be provided with a projection-shaped connecting member adjacent to the opening.

The workpiece may be formed with the projection-shaped connecting member formed in a curved shape along a circumferential direction of the cylindrical portion.

A turn forming direction of at least one or more of the cylindrical portions may be different from a turn forming direction of the other cylindrical portion.

An apparatus for producing a coil for an electric apparatus comprising a cutting means having a wire-tool stretched between a first roll and a second roll arranged inside and outside of a cylindrical portion for a block shaped workpiece formed with the cylindrical portion corresponding to the coil and performing cutting operation by moving the wire-tool in a lengthwise direction of the wire, and a moving means for turning the cutting means while moving it relatively to the workpiece from a part corresponding to one end side toward a part corresponding to other end side of the coil along a machining line spirally set in a circumferential direction of the cylindrical portion, wherein a spiral coil is formed by spirally cutting the cylindrical portion.

The moving means may turn the second roll of the cutting means while moving it relatively to the cylindrical portion so as to cut one turning part of the machining line.

The first roll and the second roll of the cutting means may be relatively moved to the cylindrical portion so as to cut a transition part to a next turning part of the machining line.

Advantageous Effects of Invention

According to the coil of the present invention having such technical features, such functions and advantages as follows can be obtained.

According to the invention of claim 1, since the coil is formed by cutting the continuous cutting machining plane without generating a step in design from the block-shaped workpiece formed with a cylindrical portion corresponding to the coil using a wire-tool, it is possible to constitute a high-quality coil.

According to the invention of claim 2, machining at a uniform cutting thickness can be performed along the machining line from the center axis side of the coil to the outside of the coil using a wire-tool. By selecting diameter of the wire-tool, the cutting thickness can be selected easily.

According to the invention of claim 3, a thickness of the conductor can be changed every turn by alternatively performing cutting machining in a plane parallel with a plane of an opening and a cutting machining in a plane intersecting with the plane of the opening for transition to a next turn.

Thus, the cross-sectional area of the conductor can be made almost same while increasing the occupancy ratio that is a ratio of the conductor occupying in a slot space in the radial gap motor, so that the high-quality coil with low electric resistance can be produce.

According to the invention of claim 4, entry and leaving of the wire-tool to and from the block can be performed smoothly, and machining time can be reduced by eliminating machining at a starting part and ending part of machining.
(Parallel)

According to the invention of claim 5, it is possible to produce a coil unit in which a plurality of coils are connected in parallel by using the workpiece in which a plurality of blocks are integrally connected with the connecting member.

This enables to provide the high-quality coil unit which is small in electric resistance, in addition to reduce a physical connection and a connection process.

According to the invention of claim 6, it is possible to prevent the second roll from interfering with an adjacent coil when producing coil units connected in parallel.

According to the invention of claim 7, it is possible to prevent the second roll from interfering with an adjacent coil when producing coil units connected in parallel.
(Series)

According to the invention of claim 8, it is possible to produce the series coil unit in which coils excepting those at both ends are continuously and integrally connected to a start end and a terminal end of a lead wire.

This enables to provide the high-quality coil unit which is small in electric resistance, in addition to reduce a physical connection and a connection process.
(Integrated in Series)

According to the invention of claim 9, since the cutting machining is performed for forming turns from a plurality of pieces worth of cylindrical block, it is possible to enhance rigidity of the workpiece. This enables to facilitate handling of the workpiece including machined parts with relatively ease.

According to the invention of claim 10, the machining direction can be smoothly changed so that a wire of the wire-tool can be prevented from cutting.

According to the invention of claim 11, it is possible to produce the continuous and integrated coil unit from the plurality of pieces worth of cylindrical block.

According to the invention of claim 12, coil separation machining from the plurality of pieces worth of cylindrical block can be performed using only the first roll and the second roll.

According to the invention of claim 13, it is possible to reverse an electric phase.

According to the inventions of claim 14 to claim 16, it is possible to provide an apparatus for producing the high-quality coil by the cutting operation using the wire-tool.

Although oxide-based high-temperature super-conductive substance that is ceramic is electrically ideal, workability in bending and bonding is not good, accordingly, it is difficult to form the coil using a conventional method in which the wire is wound by bending it.

According to the present invention, there is no process for winding the workpiece by bending machining, the workpiece, even if it is ceramic-based materials, can be baked into a shape to be machined and machining for grooving can be applied thereto, the coil unit in which a coil or a plurality of coils being in a row can be thereby formed.

BRIEF DESCRIPTION OF DRAWINGS

FIG. 1A-FIG. 1C are a perspective view, a XY plane view and a YZ plane view of a first embodiment of the present invention before machining.

FIG. 2A-FIG. 2F are perspective views of the first embodiment of present invention during machining.

FIG. 3A-FIG. 3F are the XY plane views of the first embodiment of present invention during machining.

FIG. 4A-FIG. 4F are the XZ plane views of the first embodiment of present invention during machining.

FIG. 7A-FIG. 7C are a perspective view, a XY plane view and a XZ plane view of a second embodiment of present invention after machining.

FIG. 8 is a perspective view of a third embodiment of present invention after machining.

FIG. 13A-FIG. 13C are a perspective view, a XZ plane view and a YZ plane view of a fifth embodiment of the present invention.

FIG. 19A-FIG. 19D are a perspective view, a XY plane view, a XZ plane view and YZ plane view of a block of seventh embodiment of the present invention.

FIG. 20A-FIG. 20D are a perspective view, a XY plane view, a XZ plane view and YZ plane view of a coil of seventh embodiment after machining of a groove for forming a turn.

FIG. 23A-FIG. 23D are a perspective view, a XY plane view, a XZ plane view and YZ plane view of a block of eighth embodiment of the present invention.

FIG. 26A-FIG. 26C are sectional views of a coil according to a prior art and sectional views of the coil produced by the method for producing the coil of the present invention.

DESCRIPTION OF EMBODIMENTS

Figure 5A:
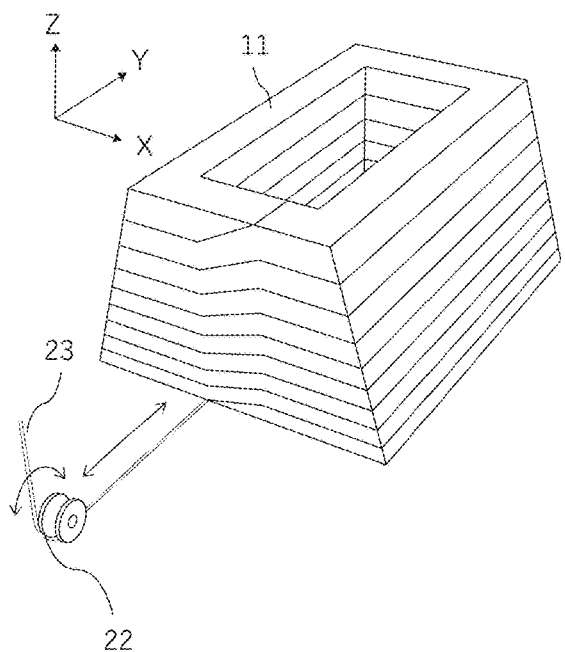
FIG. 5A-FIG. 5C are a perspective view, a XY plane view and a XZ plane view of a first embodiment of present invention after machining.

Regarding an embodiment of a method for producing a coil and a coil unit of the present invention, as an example, a method for producing a coil for a radial gap motor by machining using a wire-tool will be described in detail as follows. Note that, embodiments described later are preferable specific examples when working it, therefore, various technical limitations have been made thereto, the present invention is not limited to these embodiments unless explicitly stated to limit the present invention thereto in the following description.

First Embodiment

Regarding a method for producing a coil of the first embodiment, an example of machining method will be described with reference to FIG. 1A-FIG. 1C to FIG. 5A-FIG. 5C.

A block 11 that becomes a workpiece is formed in a cylindrical shape so as to have an opening 12 in a shape of substantially teeth of a stator of the radial gap motor arranged together with an insulator and taper 13 corresponding to an angle between the teeth. The description will be made supposing a short side of an opening plane of the opening 12 as X direction, a long side as Y direction and a direction of convex of the teeth of a stator which is an axial direction of a cylinder as Z direction.

When the block 11 that becomes the workpiece is a metallic material such as copper or aluminum, etc., the block machined by pressing, extrusion, casting or cutting or the like is used. When the block 11 that becomes the workpiece is a hard-to-machining material such as ceramic or the like, the block molded by a powder metallurgical techniques such as hot press, pulse electrification sintering or the like is used.

Machining machine 2 comprises a first roll 21, a second roll 22, a wire-tool 23, a drive roll 24, and a tensioner 25. The first roll 21 is rotatably supported by a beam 26 of width T and the second roll 22 as well by a beam 27, so that they can move in the X direction, Y direction and Z direction. Moreover, the second roll 22 comprises a mechanism to turn the first roll 21.

As shown in FIG. 1A-FIG. 1C, the wire-tool 23 is formed in a closed loop-shape and wound around the drive roll 24b multiple times, and the wire-tool 23 is reciprocated or turned in one direction in response to the rotation of the drive roll 24. Or the wire-tool 23 may be configured that it is wound around a drive roll 24a at one end and around the drive roll 24b at the other end multiple times respectively and the wire-tool 23 is reciprocated according to forward rotation and reverse rotation of the drive roll 24.

Tension of the wire-tool 23 stretched between the first roll 21 and the second roll 22 may be adjusted based on, for example, a position of the tensioner 25.

In this example, the first roll 21, the second roll 22, the wire-tool 23, drive roll 24 and the tensioner 25 are corresponding to a cutting means, the beams 26, 27 and a mechanism (not shown) for moving them in the XYZ directions are corresponding to a moving means. Specifically, the beam 26, 27 have only to be attached to a known mechanism such as a multi-axis manipulator. Moreover, as the moving means, any mechanism may be used as long as it can move the cutting means relatively to the block 11, it is not particularly limited. For example, it may be configured that the block 11 is fixed to a placing table movable in the XYZ directions and the placing table is moved and turned spirally with respect to the cutting means.

Machining processes will be described with reference to FIG. 2A-FIG. 2F to FIG. 5A-FIG. 5C.

(Process 1)

As shown in FIG. 2A, FIG. 3A and FIG. 4A, the first roll 21 and the second roll 22 are moved such that the wire-tool 23 contacts with a machining start position of the block 11.

(Process 2)

As shown in FIG. 2B, FIG. 3B and FIG. 4B, the cutting machining of the block 11 is performed to a prescribed thickness of a first turn by moving the first roll 21 and the second roll 22 in –X direction and –Z direction, while moving the wire-tool 23 in a wire length direction.

(Process 3)

As shown in FIG. 2C-FIG. 2E, FIG. 3C-FIG. 3E and FIG. 4C-FIG. 4E, the cutting machining of a plane in parallel with a XY plane is performed by relatively rotating the block 11 and the second roll 22, while moving the wire-tool 23 in the wire length direction, so that the coil for one turn is formed.

(Process 4)

As shown in FIG. 2F, FIG. 3F and FIG. 4F, the cutting machining of the block 11 is performed to a prescribed thickness of the next turn by moving the first roll 21 and the second roll 22 in the –X direction and the –Z direction, while moving the wire-tool 23 in the wire length direction.

Figure 5B:
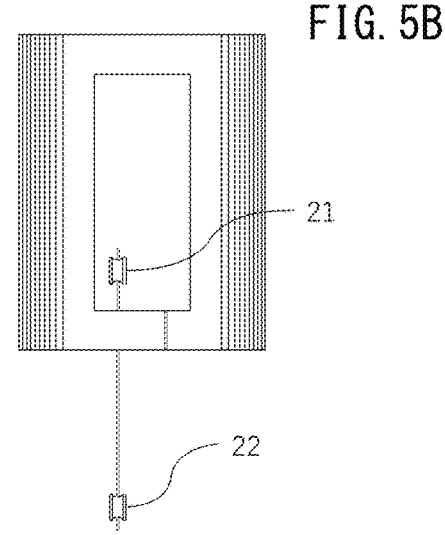
Figure 5C:
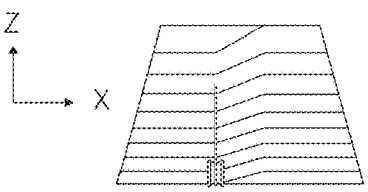

A block after machining as shown in FIG. 5A-FIG. 5C can be obtained by repeating (process 2) to (process 4) in FIG. 2B-FIG. 2D, FIG. 3B-FIG. 3D and FIG. 4B-FIG. 4D thereafter.

Since no intersection of cutting planes occurs, excessive cutting does not occur when forming the coil, a cross-sectional area of the coil can be increased. To decrease electric resistance of the coil, it is desirable to optimize the conductor thickness of each turn considering the cutting thickness due to the wire-tool 23, such that the sectional areas S1 to S6 of respective turns of the conductor arranged in the slot are almost identical as shown in FIG. 26C. To increase the cross-sectional area of the coil, it is desirable to make narrower a wire diameter of the wire-tool 23 within a limit that such problem as formation of an insulation film and disconnection does not arise. The insulation film which satisfies required withstand voltage is formed on the workpiece after machining by electrodeposition, dipping or the like.

Second Embodiment

A method for producing the coil of the second embodiment will be described with reference to FIG. 6A-FIG. 6C to FIG. 7A-FIG. 7C. Some similar parts as the first embodiment are omitted from the description.

Figure 6A:
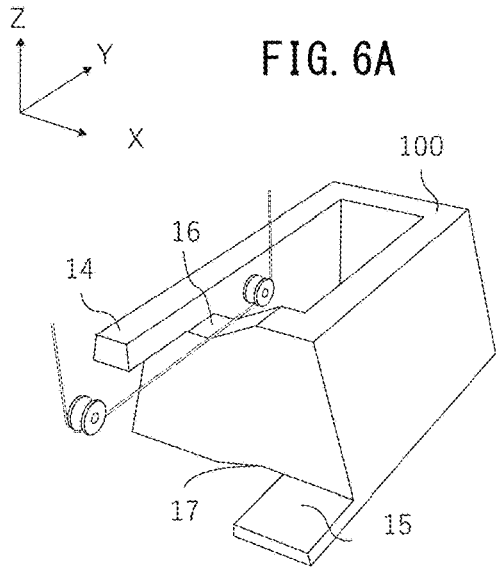
FIG. 6A-FIG. 6C are a perspective view, a XY plane view and a XZ plane view of a second embodiment of the present invention before machining.
Figure 6B:
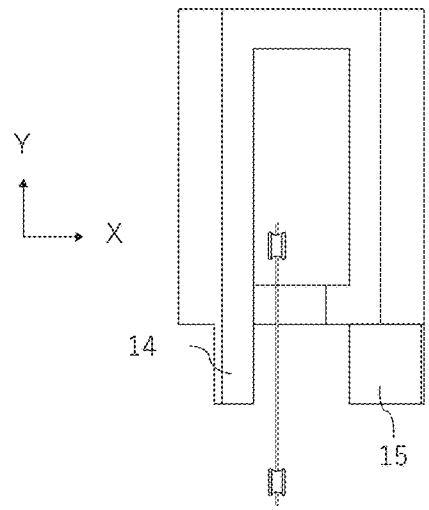
Figure 6C:
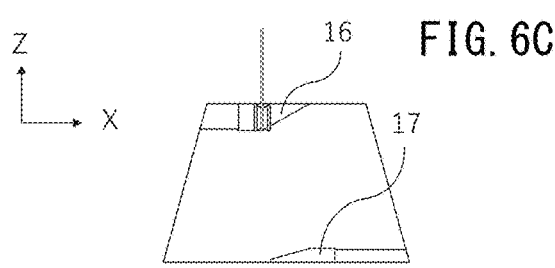

As shown in FIG. 6A-FIG. 6C, a block 100 that becomes the workpiece comprises a coil terminal 14 on an inner diameter side and a coil terminal 15 on an outer diameter side of the radial gap motor. There are provided a step portion 16 in the vicinity of the coil terminal 14 on the inner diameter side and a step portion 17 in the vicinity of the coil terminal 15 on the outer diameter side.

Accordingly, it makes it unnecessary to perform cutting machining at the vicinity of the step portion 16 and the step portion 17 which become a machining starting portion and a machining ending portion of the coil, machining time can be thereby shortened. Moreover, as compared to the first embodiment, it is possible to eliminate a process of pulling out the end of coil.

It is desirable to make a length of the step portion 17 in the Z direction in relation to the length of the terminal 15 in the Z direction longer than the wire diameter of the wire-tool 23. This will allow the wire-tool 23a to enter smoothly into the block 111 when starting machining and to release smoothly from the block 100 when finishing the machining.

By repeating machining processes same as shown in FIG. 2C-FIG. 2F to FIG. 4C-FIG. 4F of the first embodiment, the block after machining of the second embodiment shown in FIG. 7A-FIG. 7C can be obtained.

Third Embodiment

The method for producing the coil of the third embodiment will be described with reference to FIG. 8 to FIG. 11A-FIG. 11B. Some similar parts as the first embodiment and the second embodiment are omitted from the description.

As shown in FIG. 8, four cylindrical portions 211 of the workpiece 200 in the third embodiment are connected in parallel and integrally with a connecting member 18 through the coil terminals 15 on the outer diameter side. A coil unit in which four pieces of coil are continuously connected in parallel can be obtained by forming the respective cylindrical portions 211 into the coils using the coil machining method described regarding the first embodiment.

By utilizing the connecting member 18 as a bass bar for supplying an output, it is possible to reduce a process for connecting coils and the bass bar and electric resistance.

(Variation 1 of Third Embodiment)

Figure 9A:
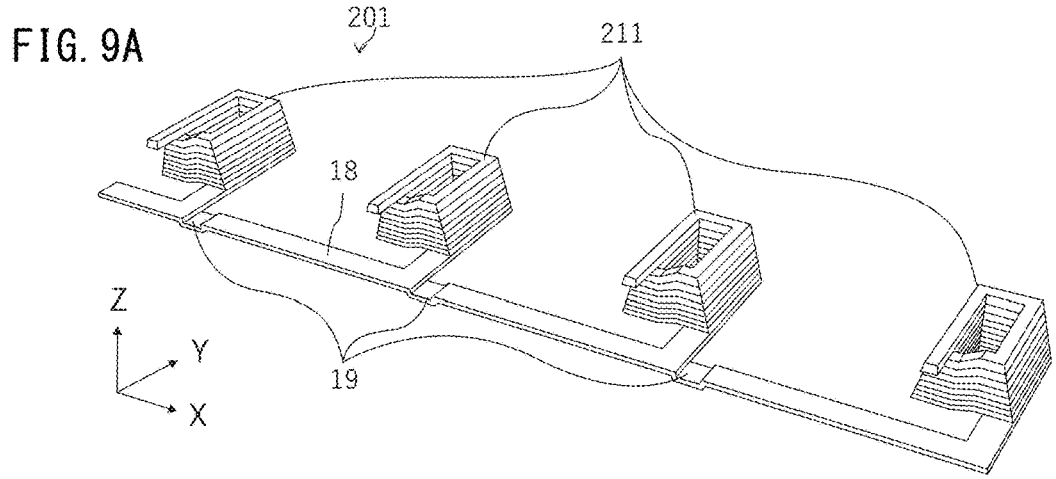
FIG. 9A-FIG. 9B are a perspective view and a XZ plane view of variation 1 of the third embodiment after machining.
Figure 9B:
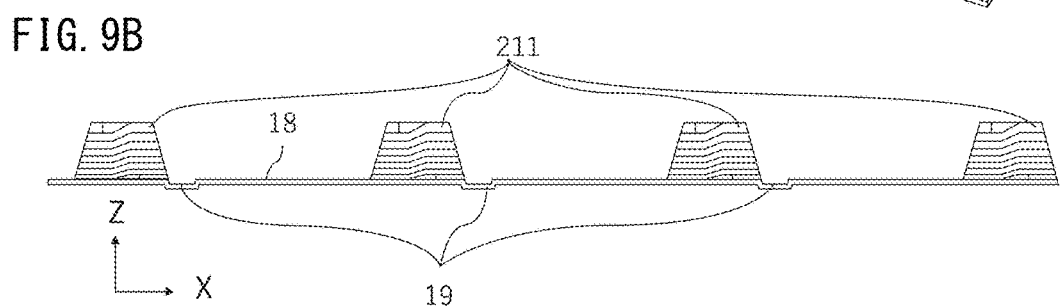
Figure 10A:
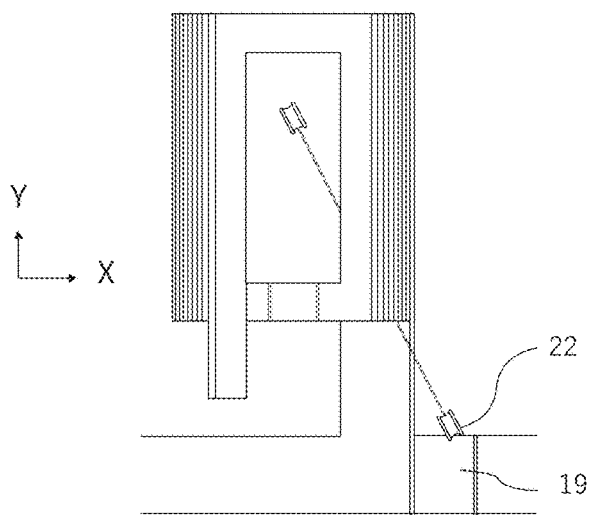
FIG. 10A-FIG. 10D are perspective views and a XZ plane views of variation 1 of the third embodiment of present invention during machining.
Figure 10C:
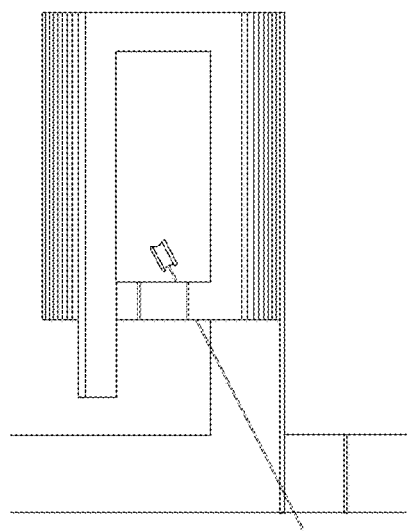
Figure 10B:
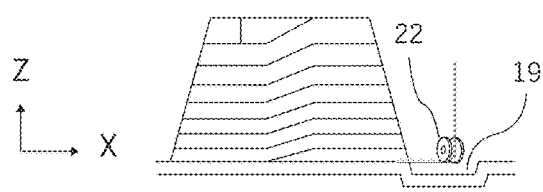
Figure 10D:
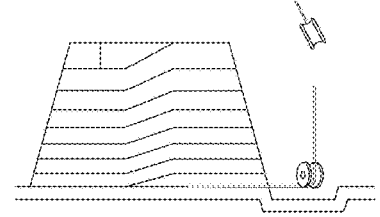

As Shown in FIG. 9A-FIG. 9B, in the variation of third embodiment 1, recessed parts 19 are provided in the connecting member 18. As shown in FIG. 10A-FIG. 10D, at the time of machining of the final turn, the second roll 22 passes through a recessed part 19, whereby machining of the workpiece 201 can be performed smoothly without interfering therewith.

(Variation 2 of Third Embodiment)

Figure 11A:
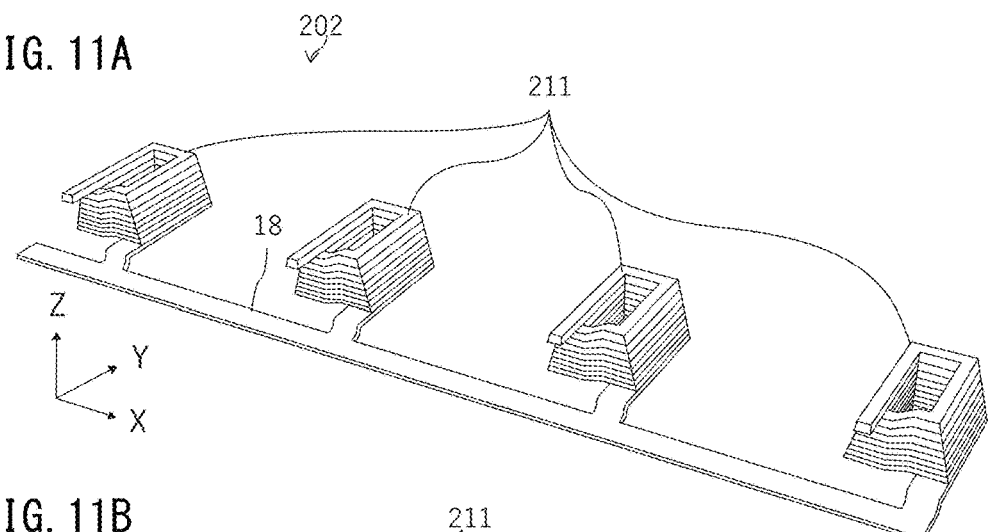
FIG. 11A-FIG. 11B are a perspective view and a XZ plane view of variation 2 of the third embodiment of present invention after machining.
Figure 11B:
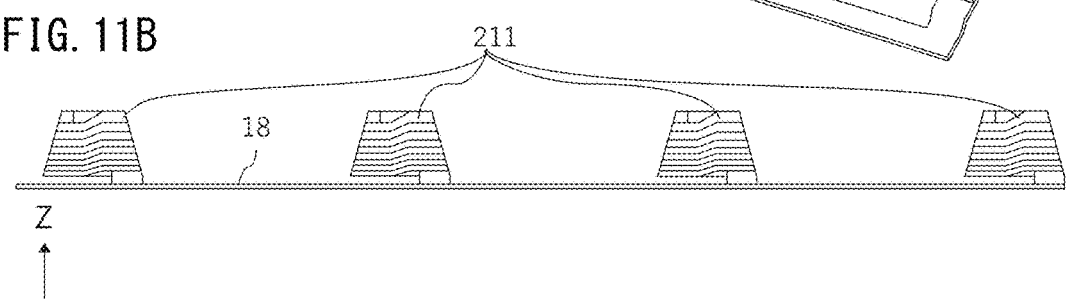

As shown in FIG. 11A-FIG. 11B, in the variation 2 of third embodiment, the connecting member 18 is located further in the –Z direction than the terminal 15 on the outer diameter side of the cylindrical portion 211 by providing the step portion. Accordingly, the second roll 22 can perform machining of the workpiece 202 smoothly without interfering therewith at the time of the cutting machining of the final turn as with the variation 1.

Fourth Embodiment

Regarding a method for producing of fourth embodiment, as an example, a method for producing total of 12 pieces of coil comprising U-phase, V-phase and W-phase coils each comprising 4 pieces of coil will be described with reference to FIG. 12A-FIG. 12B. Some similar parts as the first embodiment to the third embodiment are omitted from the description.

Description will be made supposing that a normal direction of the opening plane of the U-phase coil is Z-direction.

Figure 12A:
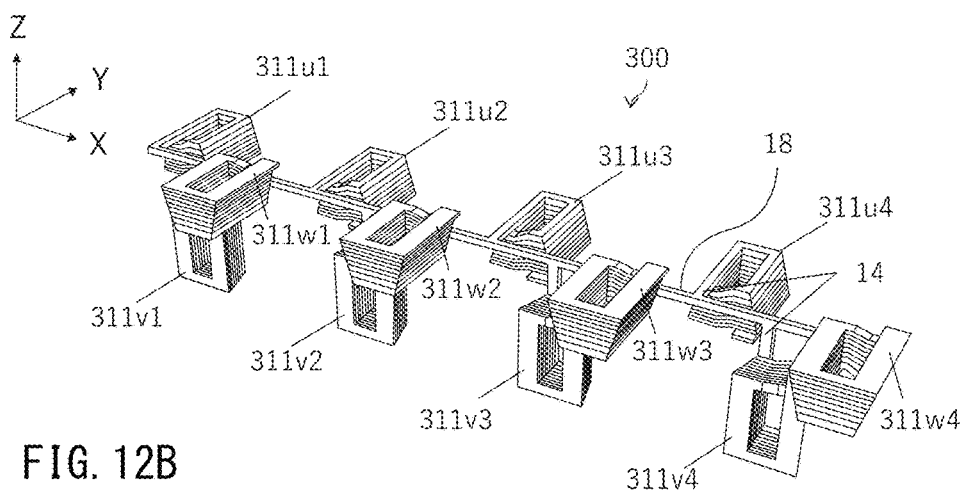
FIG. 12A-FIG. 12B are a perspective view and a XZ plane view of a fourth embodiment of present invention after machining.
Figure 12B:
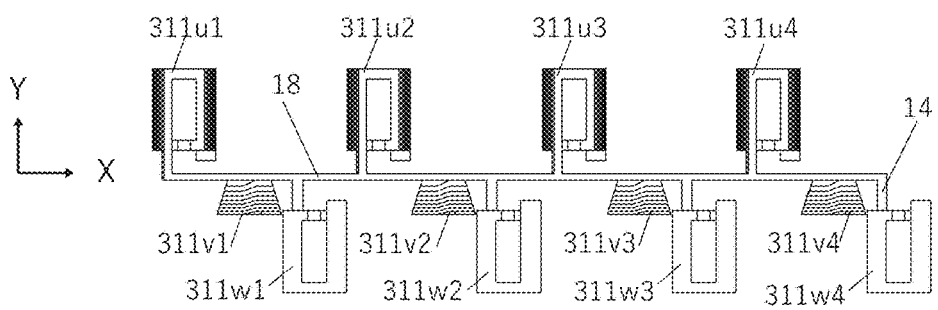

As shown in FIG. 12A-FIG. 12B, a workpiece 300 of the fourth embodiment comprises 12 pieces of cylindrical portion 311 which are connected integrally in parallel and arranged in sequential order to the motor stator by the connecting member 18 though the coil terminals 14 on the inner diameter side. Moreover, the normal directions of opening plane of respective phases are different. The normal direction of opening plane of the cylindrical portion 311$u$ that becomes U-Phase coil is +Z direction, the normal direction of opening plane of the cylindrical portion 311$v$ that becomes V-Phase coil is +Y direction and the normal direction of opening plane of the cylindrical portion 311$w$ that becomes W-phase coil is +Z direction.

By connecting the coils 311 to the connecting member 18 in different directions, it is possible to prevent the second roll 22 from interfering with the other adjacent cylindrical portions 311, when it is turned relatively to the cylindrical portions 311. Moreover, by utilizing the connecting member 18 as a neutral point of a star connection, it is possible to reduce a wire connection process between the coils and the neutral point as well as the electric resistance.

Fifth Embodiment

The method for producing the coil of the fifth embodiment will be described with reference to FIG. 13A-FIG. 13C to FIG. 15. Some similar parts as the first embodiment to the fourth embodiment are omitted from the description.

As shown in FIG. 13A-FIG. 13C, the workpiece 400 of the fifth embodiment comprises 4 pieces of cylindrical portions 411, the cylindrical portions excepting those at both ends are connected integrally in series by connecting each coil terminal 15 on the outer diameter side and the next coil terminal 14 on the inner diameter side through the connecting member 18.

Figure 14A:
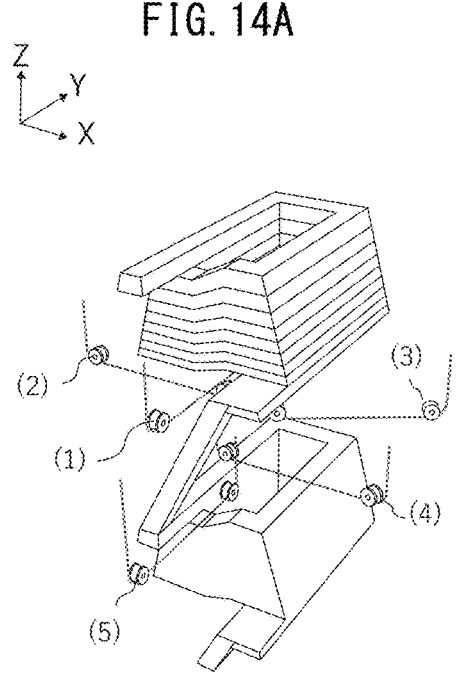
FIG. 14A-FIG. 14C are a perspective view and a XY plane view and a XZ plane view of a fifth embodiment of present invention while machining.
Figure 14B:
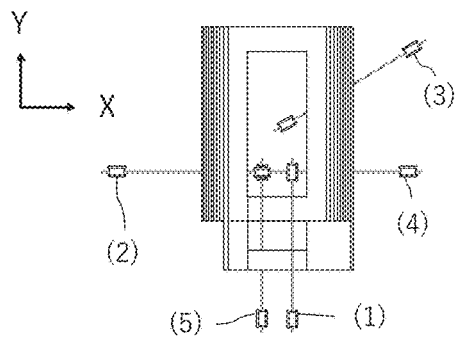
Figure 14C:
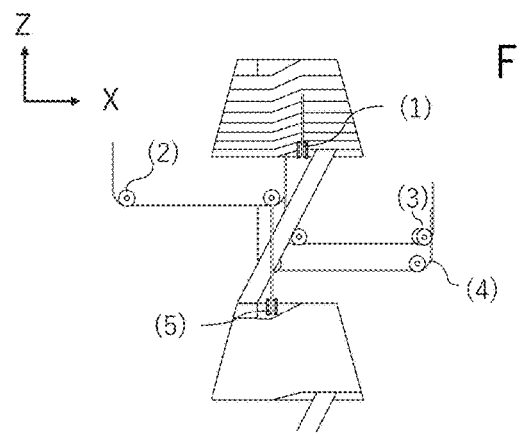

As shown in FIG. 14A-FIG. 14C, it is possible that the second roll is turned in order from a state (1) in which the machining for forming the first turn has been finished, to (6) in the XY plane view, and the first roll and the second roll are also relatively moved in the −Z direction as shown in the XZ plane view, the wire-tool is thereby moved up to a machining start position of the next cylindrical portion without interfering with the workpiece.

Figure 15:
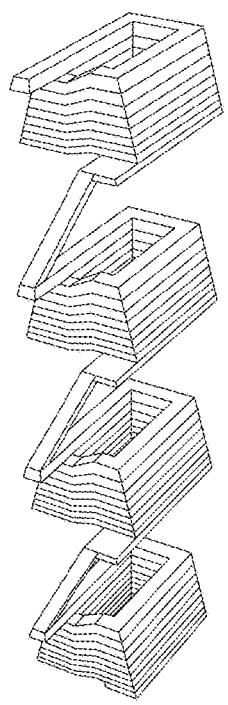
FIG. 15 is a perspective view of a fifth embodiment of present invention after machining.

By repeating above processes, the coil unit in which 4 pieces of coil are continuously connected in series can be obtained as shown in FIG. 15. Accordingly, it is possible to produce the plurality of coils without removing the wire-tool. It is possible to reduce the wire connection process and the electric resistance between coils.

When the cylindrical portion 411$u$1 to the cylindrical portion 411$u$4 are machined in order, the beam 27 supporting the first roll 21 is resulted in passing through the cylindrical portions 411$u$1 to the cylindrical portion 411$u$3 at the time of machining the cylindrical portion that becomes the last machined block. The openings of the cylindrical portions 411$u$1 to 411$u$4 are almost the same enough to the extent that the beam 27 would not interfere therewith, when preforming the last machining.

Sixth Embodiment

A method for producing of the sixth embodiment will be described with reference to FIG. 16A-FIG. 16C to FIG. 18 by taking an example a coil unit in which coils whose turn forming directions are alternatively different are continuously connected in series. Some similar parts as the first embodiment to the fifth embodiment are omitted from the description.

Figure 16A:
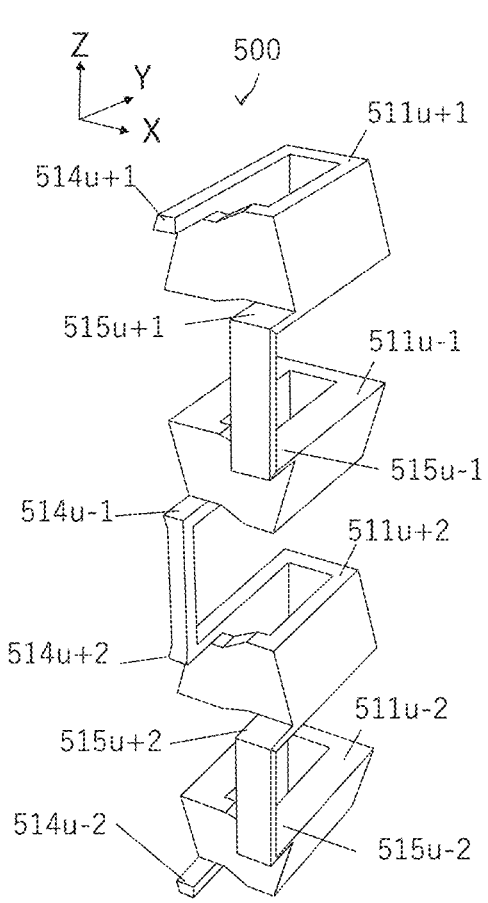
FIG. 16A-FIG. 16C are a perspective view, a XZ plane view and a YZ plane view of a block of the sixth embodiment.
Figure 16B:
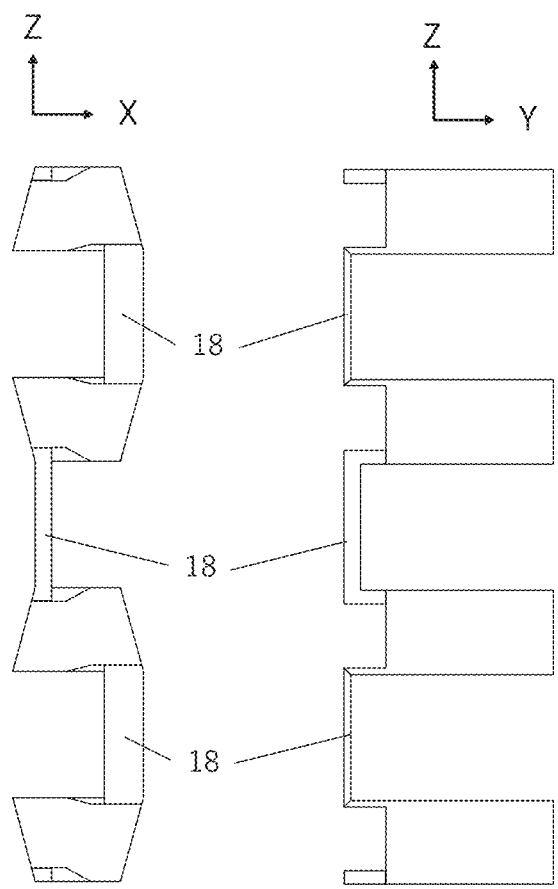
Figure 16C:
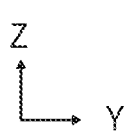

As shown in FIG. 16A-FIG. 16C, a workpiece 500 of the sixth embodiment comprises 4 pieces of the cylindrical portions 511, the cylindrical portions except those at both ends are connected integrally in series by connecting the coil terminals 15 on the outer diameter side each other or the coil terminal 14 on the inner diameter side each other through the connecting member 18.

Figure 17A:
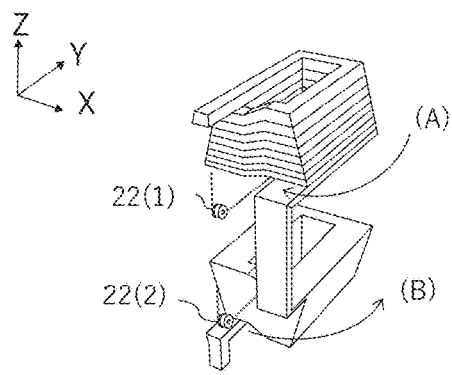
FIG. 17A-FIG. 17C are a perspective view, a XY plane view and a XZ plane view of a sixth embodiment of present invention during machining.
Figure 17B:
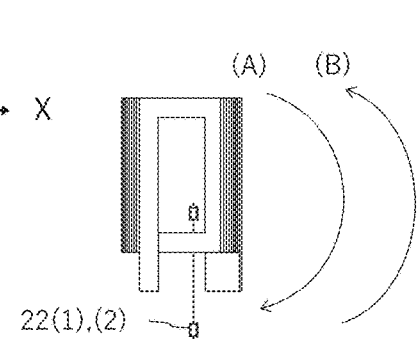
Figure 17C:
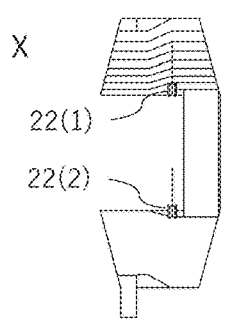

As shown in FIG. 17A-FIG. 17C, the first roll and the second roll are moved relatively in the −Z direction from a state (1) in which a first machining for forming the turn of the cylindrical portion has been finished as shown in a XZ plane view in the same manner as that of the second embodiment. This allows the wire-tool to move toward a machining start position of the next cylindrical portion without interfering with the workpiece. A turn forming direction of the next cylindrical portion is opposite to the turn forming direction of the previous cylindrical portion. In FIG. 17A-FIG. 17C, the cutting machining is performed up to the position of (1) in the clockwise direction of (+) in the XY plane and in the counter-clockwise direction of (−) in the XY plane from the position of (2) that becomes the next block.

Figure 18:
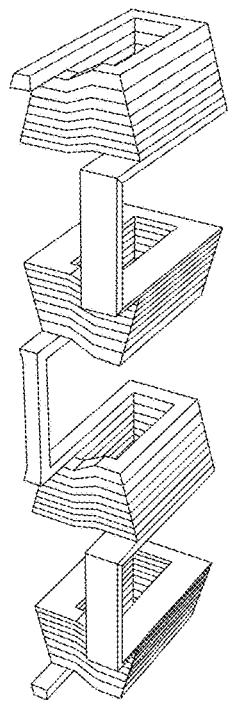
FIG. 18 is a perspective view of a sixth embodiment of the present invention after machining.
Figure 21A:
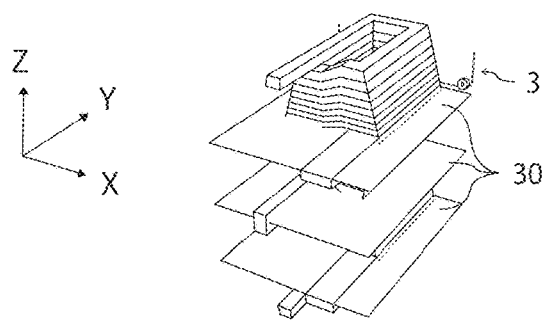
FIG. 21A-FIG. 21D are a perspective view, a XY plane view, a XZ plane view and YZ plane view of groove machining for separating a coil of the seventh embodiment of the present invention.
Figure 21C:
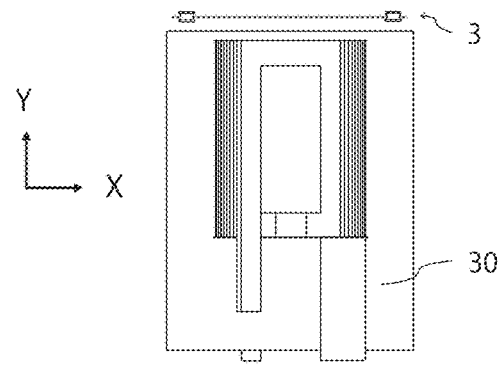
Figure 21B:
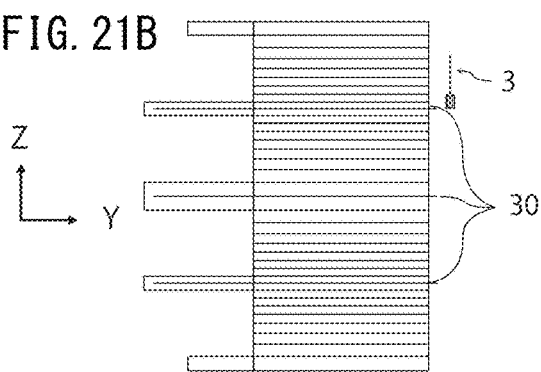
Figure 21D:
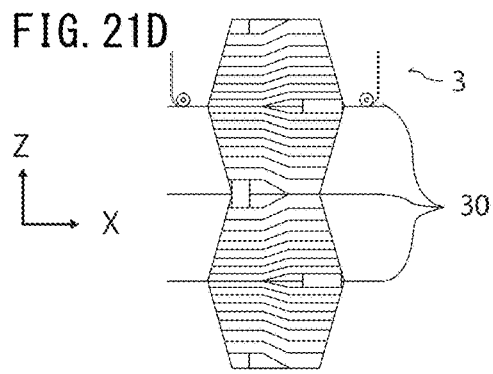

By repeating the above processes, as shown in FIG. 18, a coil unit in which 4 pieces of coils whose turn forming directions are alternatively different are continuously connected in series can be obtained. Accordingly, it is possible to reduce the wire connection process and electric resistance between coils.

For convenience of description, though suffixes of + − are placed based on the turn forming directions, it is possible to form coil units connected in series including reverse phase coils of phases different by 180 degrees according to the motor specification by suitably setting the turn forming direction of the cylindrical portion, taper angle and coil terminal.

Seventh Embodiment

A method for producing of the seventh embodiment will be described with reference to FIG. 19A-FIG. 19D to FIG. 22A-FIG. 22B by taking an example a coil unit in which coils whose turn forming directions are alternatively different are continuously connected in series. Some similar parts as the first embodiment to the sixth embodiment are omitted from the description.

As shown in FIG. 19A-FIG. 19D, a workpiece 600 of seventh embodiment comprises 4 pieces worth of integral cylindrical portion.

The projection-shaped connecting members 18 are portions that becomes the coil terminal 614 on the inner diameter side and the coil terminal 615 on the outer diameter side and are set to lengths needed for the wire connection to connect with them. It is desirable to provide a side opening 20 for changing smoothly the advancing direction of the wire-tool 23. As a shape of it, such shape is desirable that the step portion 16 at the vicinity of the coil terminal 14 on the inner diameter side and the step portion 17 at the vicinity of the coil terminal on the outer diameter side are made to be arranged in a mirror symmetrical relation. It may be a circular cutting hole by a drilling machine or the like.

As shown in FIG. 20A-FIG. 20D, a machining of the cylindrical portion is performed by a method as with that of the sixth embodiment. Next, as shown in FIG. 21A-FIG. 21D, the cutting machining for separating each of coils is performed. Specifically, a cutting machining of an opening plane which is horizontal to a machining plane 30 is performed using machining machine 3 with the connecting members 18 kept in connected.

Figure 22A:
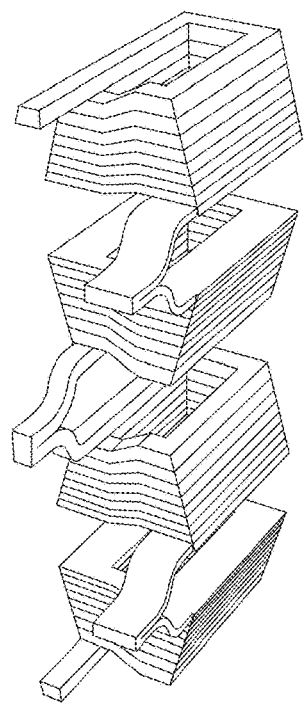
FIG. 22A-FIG. 22B are a perspective view and a YZ plane view of the seventh embodiment of the present invention after machining.
Figure 22B:
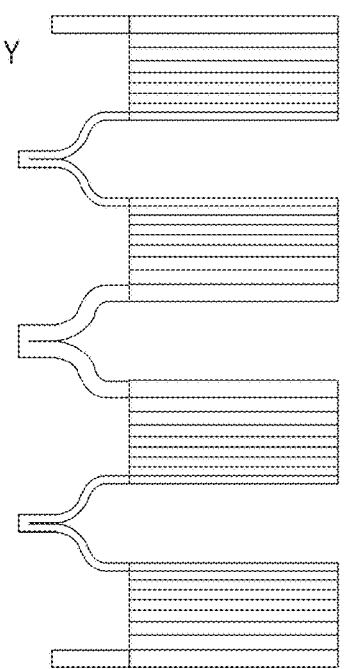

Accordingly, as shown in FIG. 22A-FIG. 22B, a coil unit in which 4 pieces of coils continuously connected in series and the it turn forming directions are alternatively different can be obtained.

As is the case with the seventh embodiment, by using the workpiece in which all the coils are integrated, the rigidity of the workpiece may be increased compared to the fifth embodiment and the sixth embodiment. Therefore, handling such as chucking of the workpiece and holding of the machined workpiece and the like are facilitated. This improves simplicity and machining accuracy of the device.

It may be possible that separation machining for separating the coils is performed every coil after completion of the turn forming machining. Moreover, it may be performed at any timing during machining for forming turns as long as the machining machine 2 (the first roll 21, the second roll 22 and wire-tool 23) and the machining machine 3 do not interfere each other. When there is no need to form the coil unit, the coil may be also formed one by one by applying the cutting machining to the whole connecting members 18. Moreover, unless the connecting member 18 and opening 20 are provided, the coil described with reference to the first embodiment can be obtained.

Eighth Embodiment

A method for producing of the eighth embodiment will be described with reference to FIG. 23A-FIG. 23D to FIG. 24A-FIG. 24F by taking an example a coil unit in which coils whose turn forming directions are alternatively different are continuously connected in series. Some similar parts as the first embodiment to the seventh embodiment are omitted from the description.

As shown in FIG. 23A-FIG. 23D, the workpiece 700 of the eighth embodiment comprises 4 pieces worth of integrated cylindrical portion. The projection-shaped connecting member 18 are portions which become to be the coil terminal 614 on the inner diameter side and the coil terminal 615 on the outer diameter side and set to lengths needed for wire connection to connect each other. Moreover, the projection-shaped connecting member 18 is curved outwardly in parallel to the XY plane.

Figure 24A:
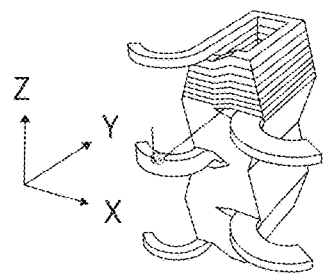
FIG. 24A-FIG. 24F are perspective views and XY plane views of groove machining for separating a coil of eighth embodiment of the present invention.
Figure 24C:
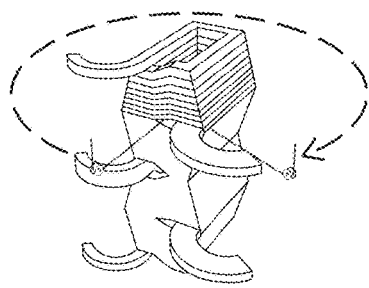
Figure 24E:
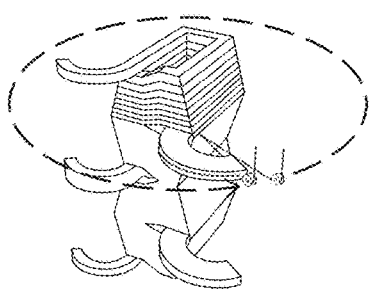
Figure 24B:
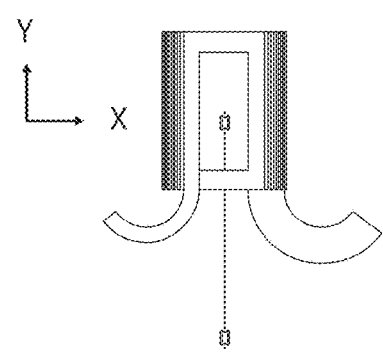
Figure 24D:
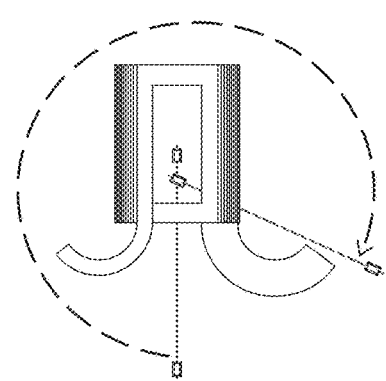
Figure 24F:
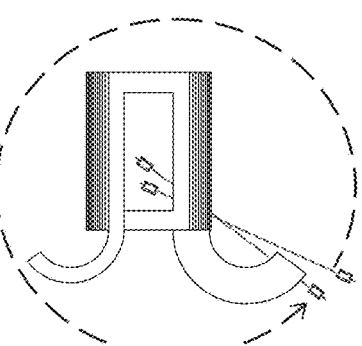
Figure 25:
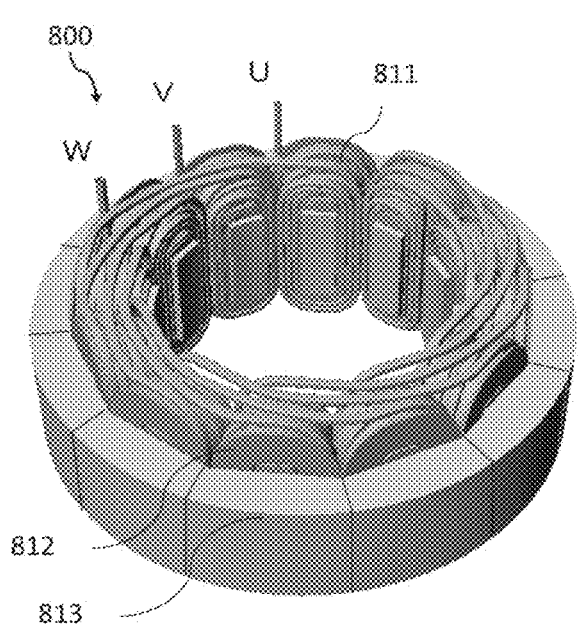
FIG. 25 is a perspective view of a stator of a radial gap motor.

As shown in FIG. 24A-FIG. 24B, the cutting machining for forming a turn of the cylindrical portion corresponding to the first coil portion is performed by a similar method to the second embodiment. Next, as shown in FIG. 24C-FIG. 24D, portions except the projection-shaped connecting member 18 are machined by turning the second roll 22 in the clockwise direction in the machining plane for coil separation. Next, as shown in FIG. 24E-FIG. 24F, cutting machining of the projection-shaped connecting member 18 is performed by turning the second roll 22 around the coil separation machining plane in the counter-clockwise direction. Next a cutting machining for forming the turn at a place corresponding to the second coil is performed.

By repeating above processes, a coil unit similar to that of the seventh embodiment in which 4 pieces of the coil continuously connected in series and whose turn forming directions are alternatively different can be obtained.

According to the method of the eighth embodiment, since the cutting machining for coil separation can be performed using the machining machine 2 (the first roll 21, the second roll 22 and the wire-tool 23) without using the machining machine 3, the apparatus can be simplified.

Moreover, when distance of the wire connection between coils is long, the projection-shaped connecting member 18 becomes long, accordingly, it is required to elongate the stretching distance of the wire-tool 23 so as to enlarge the turning radius of the second roll 22 to avoid the interference between the projection-shaped member 18 and the second roll 22. In this instance, a distance between the first roll 21 and the second roll 22 is widened, a passing position of the wire-tool 23 is likely to deviate which would result in degradation of the machining accuracy.

According to the method of the eighth embodiment, the distance between the first roll 21 and the second roll 22 can be shortened by curving the projection-shaped connecting members 18, this would result in an improvement in machining accuracy and miniaturization of the machining machine.

REFERENCE SIGNS LIST 2, 3 . . . machining machine, 11 . . . block (cylindrical portion), 12 . . . opening, 13 . . . taper, 14 . . . coil terminal on inner diameter side, 15 . . . coil terminal on outer diameter side, 16 . . . recessed part (inner diameter side), 17 . . . recessed part (outer diameter side), 18 . . . connecting member, 19 . . . step portion provided in the connecting member, 20 . . . side opening, 21 . . . first roll of machining machine 2, 22 . . . second roll of machining machine 2, 23 . . . wire-tool of machining machine 2, 24 . . . drive roll of machining machine 2, 25 . . . tensioner of machining machine 2, 30 . . . machining plain for separating coils, 111 . . . cylindrical portion of second embodiment, 200 . . . workpiece of third embodiment (after machining), 201 . . . workpiece of varied embodiment 1 of third embodiment (after machining), 202 . . . workpiece of varied embodiment 2 of third embodiment (after machining), 211 . . . cylindrical portion of third embodiment, 300 . . . workpiece of fourth embodiment (after machining), 311 cylindrical portion of fourth embodiment, 400 . . . workpiece of fifth embodiment, 411 . . . cylindrical portion of fifth embodiment, 414 . . . coil terminal on inner diameter side of fifth embodiment, 415 . . . coil terminal outer diameter side of fifth embodiment, 500 . . . Workpiece of sixth embodiment, 511 . . . cylindrical portion of sixth embodiment, 514 . . . coil terminal on inner diameter side of sixth embodiment, 515 . . . coil terminal on outer diameter side of sixth embodiment, 600 . . . workpiece of seven embodiment, 611 . . . cylindrical portion of the seventh embodiment, 614 . . . coil terminal on inner diameter side of seventh embodiment, 615 . . . coil terminal on outer diameter side of seventh embodiment, 700 . . . workpiece of eighth embodiment, 711 . . . cylindrical portion of eighth embodiment, 714 . . . coil terminal on inner diameter side of eighth embodiment, 715 . . . coil terminal on outer diameter side of seventh embodiment, 800 . . . stator of radial gap motor, 810 . . . dead space, 811 . . . example of coil of prior art, 812 . . . insulator, 813 . . . divided core, 911 . . . example of coil of cited document.

The invention claimed is:
1. A method for producing a coil for an electric apparatus, comprising:
cutting spirally a plurality of block-shaped workpieces formed with a plurality of cylindrical portions, each of the plurality of cylindrical portions corresponding to the coil in a circumferential direction of the cylindrical portion, wherein a spiral coil is formed from each of the plurality of cylindrical portions by turning a cutting means while moving it from a part corresponding to one end side to a part corresponding to another end side of the coil relatively to each of the plurality of workpieces along a machining line set spirally in a circumferential direction of the cylindrical portion;

wherein the cutting means comprises a wire-tool which is stretched between a first roll and a second roll arranged on an inside and an outside of the cylindrical portion respectively, the first roll and the second roll are moved relatively to the cylindrical portion and turned so as to move the wire-tool along the machining line while performing a cutting operation by moving the wire-tool in its lengthwise direction;

wherein the spiral coil is formed by repeating a first machining process for cutting one circular part of the machining line by turning the second roll while moving it relatively to the cylindrical portion and a second machining process for cutting a transition part to a next circular part of the machining line by moving the first roll and the second roll relatively to the cylindrical portion;

wherein, the each of the plurality of workpieces comprises a lead-out portion molded at a part of the cylindrical portion corresponding to the one end side or the other end side of the cylindrical coil and a step portion formed on an end face of the cylindrical portion where the lead-out is molded;

wherein each of the plurality of cylindrical portions is integrally attached to a connecting member through the each lead-out portion; and wherein a direction of a center axis of the machining line of at least one of the cylindrical portions is different from that of another of the cylindrical portions.

2. A method for producing a coil for an electric apparatus, comprising:

cutting spirally a plurality of block-shaped workpieces formed with a plurality of cylindrical portions, each of the plurality of cylindrical portions corresponding to the coil in a circumferential direction of the cylindrical portion, wherein a spiral coil is formed from each of the plurality of cylindrical portions by turning a cutting means while moving it from a part corresponding to one end side to a part corresponding to another end side of the coil relatively to each of the plurality of workpieces along a machining line set spirally in a circumferential direction of the cylindrical portion;

wherein the each of the plurality of workpieces is formed with the cylindrical portion corresponding to the coil;

wherein the each of the plurality of workpieces is formed with a respective opening at part corresponding to one end side or the other end side of the coil;

wherein a projection-shaped connecting member is adjacent to the opening;

wherein the projection-shaped connecting member is formed in a curved shape along the circumferential direction of the cylindrical portion; and each of the plurality of cylindrical portions is arranged in series and integrally attached to the projection-shaped connecting member, wherein a turn forming direction of at least one or more of the cylindrical portions is different from a turn forming direction of another cylindrical portion of the cylindrical portions.

* * * * *